US009749754B2

(12) United States Patent
Merks

(10) Patent No.: US 9,749,754 B2
(45) Date of Patent: Aug. 29, 2017

(54) HEARING AIDS WITH ADAPTIVE BEAMFORMER RESPONSIVE TO OFF-AXIS SPEECH

(71) Applicant: Starkey Laboratories, Inc., Eden Prairie, MN (US)

(72) Inventor: Ivo Merks, Eden Prairie, MN (US)

(73) Assignee: Starkey Laboratories, Inc., Eden Prairie, MN (US)

( * ) Notice: Subject to any disclaimer, the term of this patent is extended or adjusted under 35 U.S.C. 154(b) by 0 days.

(21) Appl. No.: 14/679,226

(22) Filed: Apr. 6, 2015

(65) Prior Publication Data

US 2015/0281855 A1 Oct. 1, 2015

Related U.S. Application Data

(63) Continuation of application No. 13/729,189, filed on Dec. 28, 2012, now Pat. No. 9,002,045.

(60) Provisional application No. 61/582,086, filed on Dec. 30, 2011.

(51) Int. Cl.

*H04R 25/00* (2006.01)
*G01S 3/802* (2006.01)
*G10L 21/0216* (2013.01)
*H04B 15/00* (2006.01)

(52) U.S. Cl.

CPC ............ *H04R 25/402* (2013.01); *G01S 3/802* (2013.01); *G10L 21/0216* (2013.01); *H04R 25/407* (2013.01); *H04R 25/50* (2013.01); *H04R 2225/021* (2013.01); *H04R 2225/023* (2013.01); *H04R 2225/025* (2013.01)

(58) Field of Classification Search

CPC ........ H04R 1/32; H04R 25/552; H04R 25/40; H04R 25/402; H04R 25/405; H04R 2203/12; H04R 2430/23

USPC ........................ 381/312, 313, 314, 23.1, 356

See application file for complete search history.

(56) References Cited

U.S. PATENT DOCUMENTS 5,651,071 A 7/1997 Lindemann et al.
7,212,642 B2 5/2007 Rasmussen
9,002,045 B2 4/2015 Merks
2006/0177079 A1* 8/2006 Baekgaard Jensen et al. ............................ 381/312
2007/0269064 A1* 11/2007 Allegro-Baumann .. H04S 3/008 381/313

(Continued)

FOREIGN PATENT DOCUMENTS

DE 102006049870 A1 5/2008
EP 1326478 A2 7/2003

(Continued)

OTHER PUBLICATIONS

"U.S. Appl. No. 13/729,189, Advisory Action mailed Sep. 3, 2014", 3 pgs.

(Continued)

*Primary Examiner* — Sunita Joshi

(74) *Attorney, Agent, or Firm* — Schwegman Lundberg & Woessner, P.A.

(57) ABSTRACT

A hearing assistance system includes an adaptive directionality controller to control a target direction for sound reception. The adaptive directionality controller includes a beamformer, a speech detector to detect off-axis speech being speech that is not from the target direction, and a steering module to steer the beamformer in response to a detection of the off-axis speech.

20 Claims, 13 Drawing Sheets

(56) References Cited

U.S. PATENT DOCUMENTS

| | | | | |
|---|---|---|---|---|
| 2008/0212814 | A1 | 9/2008 | Barthel et al. | |
| 2009/0034752 | A1* | 2/2009 | Zhang et al. | 381/92 |
| 2009/0175466 | A1 | 7/2009 | Elko et al. | |
| 2010/0158290 | A1 | 6/2010 | Puder | |
| 2011/0103626 | A1* | 5/2011 | Bisgaard | H04R 3/005 381/313 |
| 2012/0008807 | A1* | 1/2012 | Gran | H04R 25/407 381/313 |
| 2013/0195296 | A1 | 8/2013 | Merks | |

FOREIGN PATENT DOCUMENTS

| | | | |
|---|---|---|---|
| EP | 1858291 | A1 | 11/2007 |
| EP | 1916872 | A2 | 4/2008 |
| EP | 2200345 | A1 | 6/2010 |
| EP | 2339574 | A1 | 6/2011 |
| WO | WO-2007147418 | A1 | 12/2007 |

OTHER PUBLICATIONS

"U.S. Appl. No. 13/729,189, Final Office Action mailed Jun. 26, 2014", 21 pgs.

"U.S. Appl. No. 13/729,189, Non Final Office Action mailed Feb. 27, 2014", 19 pgs.

"U.S. Appl. No. 13/729,189, Notice of Allowance mailed Nov. 21, 2014", 10 pgs.

"U.S. Appl. No. 13/729,189, Response filed Apr. 30, 2014 to Non Final Office Action mailed Feb. 27, 2014", 14 pgs.

"U.S. Appl. No. 13/729,189, Response filed Aug. 26, 2014 to Final Office Action mailed Jun. 26, 2014", 14 pgs.

"U.S. Appl. No. 13/729,189, Response filed Oct. 27, 2014 to Advisory Action mailed Sep. 3, 2014", 11 pgs.

"European Application Serial No. 12199738.1, Extended European Search Report mailed Jan. 7, 2015", 6 pgs.

"European Application Serial No. 12199738.1, Response filed Jul. 28, 2015 to Extended European Search Report mailed Jan. 7, 2015", 24 pgs.

Elko, Gary W., et al., "A simple first order directional microphone", Proceedings of the IEEE Workshop Appl. Signal Process. Audio Acoust, (1995), 10 pgs.

Martin, Rainer, "Spectral Subtraction Based on Minimum Statistics", EUSIPCO-94, Edinburgh, Scotland, 13.-16., (Sep. 1994), 4 pgs.

Warsitz, Ernst, et al., "Acoustic filter-and-sum beamforming by adaptive principal component analysis", Acoustics, Speech, and Signal Processing, 2005. Proceedings. (ICASSP '05). IEEE International Conference on (vol. 4 ), (Mar. 2005).

"European Application Serial No. 12199738.1, Communication Pursuant to Article 94(3) EPC dated Oct. 25, 2016", 6 pgs.

* cited by examiner

HEARING AIDS WITH ADAPTIVE BEAMFORMER RESPONSIVE TO OFF-AXIS SPEECH

CLAIM OF PRIORITY

The present application is a continuation of U.S. patent application Ser. No. 13/729,189, filed on Dec. 28, 2012, which application claims the benefit under 35 U.S.C. §119(e) of U.S. Provisional Application Ser. No. 61/582,086, filed on Dec. 30, 2011, which applications are incorporated herein by reference in their entirety.

TECHNICAL FIELD

This document relates generally to hearing assistance systems and more particularly to hearing aids having adaptive directionality using beamformer responsive to detection of off-axis speech.

BACKGROUND

Hearing aids are used to assist people suffering hearing loss by transmitting amplified sounds to their ear canals. Damage of outer hair cells in a patient's cochlear results loss of frequency resolution in the patient's auditory perception. As this condition develops, it becomes difficult for the patient to distinguish speech from environmental noise. Simple amplification does not address such difficulty. Thus, there is a need to help such a patient in understanding speech in a noisy environment.

SUMMARY

A hearing assistance system includes an adaptive directionality controller to control a target direction for sound reception. The adaptive directionality controller includes a beamformer, a speech detector to detect off-axis speech being speech that is not from the target direction, and a steering module to steer the beamformer in response to a detection of the off-axis speech.

In one embodiment, a hearing assistance system for transmitting sounds into one or more ear canals includes a plurality of microphones to receive sounds, one or more receivers to deliver processed sounds to the one or more ear canals, and a processor coupled between the plurality of microphones and the one or more receivers to process the received sounds. The processor includes an adaptive directionality controller to control a target direction. The adaptive directionality controller includes a beamformer, a speech detector, and a steering module. The beamformer cancels received sounds that are not from the target direction by beamforming. The speech detector detects off-axis speech being speech that is not from the target direction. The steering module steers the beamformer in response to a detection of the off-axis speech to reduce cancellation of the off-axis speech by the beamformer.

In one embodiment, a method is provided for adaptive control of a target direction of sound reception by a hearing assistance system using a beamformer. Off-axis speech is detected. The off-axis speech is a speech that is not from the target direction. In response to a detection of the off-axis speech, the beamformer is steered to reduce cancellation of the off-axis speech by the beamformer.

This Summary is an overview of some of the teachings of the present application and not intended to be an exclusive or exhaustive treatment of the present subject matter. Further details about the present subject matter are found in the detailed description and appended claims. The scope of the present invention is defined by the appended claims and their legal equivalents.

BRIEF DESCRIPTION OF THE DRAWINGS

FIGS. 7-10 are graphs showing behavior of an off-axis speech detector in different scenarios.

FIGS. 10A-C show behavior of the off-axis speech detector for speech at 180 degree from the target direction and diffuse noise with an SNR at 10 dB, with the off-axis speech detector turned on.

DETAILED DESCRIPTION

Figure 1:
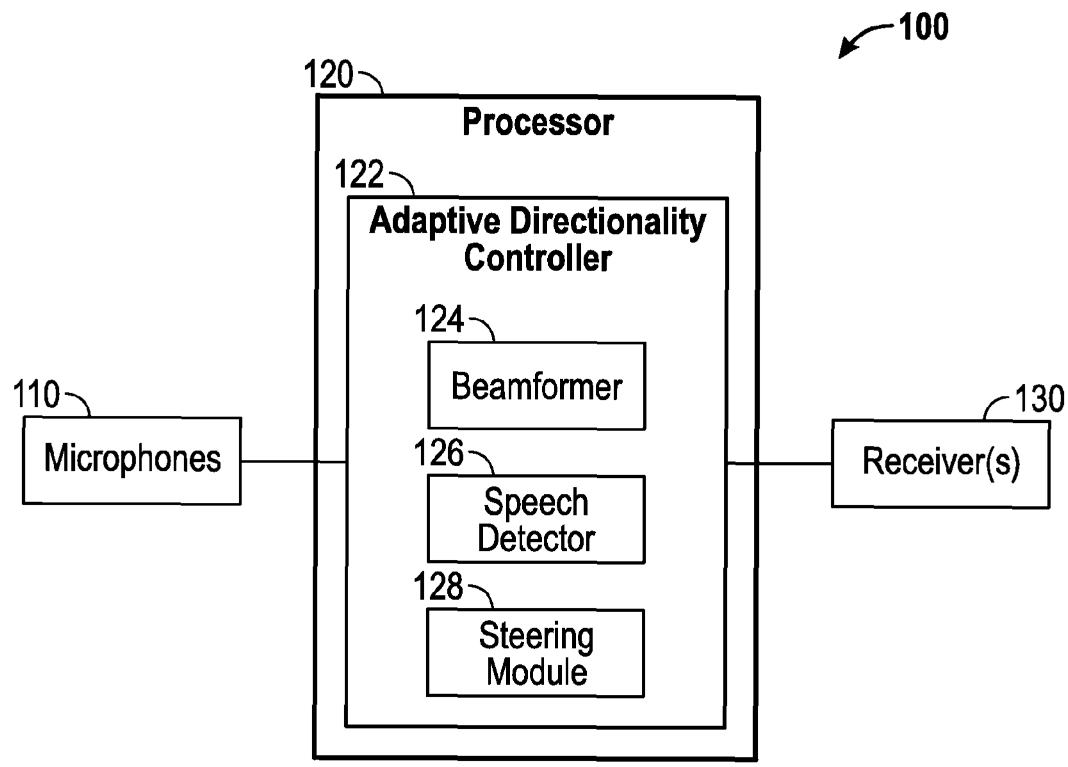
FIG. 1 is a block diagram illustrating an embodiment of a hearing assistance system having adaptive directionality control.

The following detailed description of the present subject matter refers to subject matter in the accompanying drawings which show, by way of illustration, specific aspects and embodiments in which the present subject matter may be practiced. These embodiments are described in sufficient detail to enable those skilled in the art to practice the present subject matter. References to "an", "one", or "various" embodiments in this disclosure are not necessarily to the same embodiment, and such references contemplate more than one embodiment. The following detailed description is demonstrative and not to be taken in a limiting sense. The scope of the present subject matter is defined by the appended claims, along with the full scope of legal equivalents to which such claims are entitled.

This document discusses a hearing assistance system that has adaptive directionality provided by a beamformer with off-axis speech detection and response. The beamformer combines signals of two or more microphones to amplify sound signals from a target direction while attenuating sound signals from the other directions. The limited microphone distance and the limited allowed computational complexity are the main challenges for hearing aids applications. The two or more microphones are in one hearing aid device of a mononaural hearing aid system or both hearing aid devices in a binaural hearing aid system. Adaptive beamforming provides for determination of the target direction using output of the two or more microphones.

Adaptive beamforming algorithms aim to minimize the output of the beamformer, while maintaining a 0 dB transfer function in the target direction, such as discussed in Elko, G. W. and Pong, A. N., "A simple first order directional microphone," *Proceedings of the IEEE Workshop Appl. Signal Process. Audio Acoust,* 1995: 169-172. These algorithms do not take into account the nature of the incoming signals. Hence it reduces noise signals as well as speech signals that are not coming from the target direction, i.e., off-axis speech signals. Various algorithms have been developed to address this issue. In one example, an adaptive beamforming algorithm switches to omnidirectional mode in response to detection of an off-axis speech-like signal, as is done in Starkey's Dynamic Directionality algorithm. However, this requires a discrete detection, and there will be an audible difference going from directional to omnidirectional mode. This is especially problematic when detection of off-axis speech is intermittent. Changing from the directional to omnidirectional mode may also result in changes in the noise level of up to 5 dB. Thus, frequent mode changes can be annoying for the user (listener). In another example, an adaptive beamforming algorithm uses two adaptive directional microphones to track the most dominant source without distinguishing between speech and noise, as discussed in European Patent No. EP 2 339 574 A1 to Janse et al., entitled "Speech Detector. European Patent Application". However, this requires two adaptive filters and is unable to distinguish between speech and noise.

The present system detects off-axis speech and steers the beamformer away from the detected off-axis speech, thereby reducing cancellation of the off-axis speech by the beamformer. The aim is to avoid the cancellation of the off-axis speech by the beamformer when the off-axis speech is detected. The present system does not require discrete modes in the algorithm, and does not substantially change noise level when the beamformer is steered. Change of location of the null as the beamformer is steered has limited influence (such as about 1 dB) on the experienced noise level.

The present subject matter is demonstrated for hearing assistance devices, including hearing aids, including but not limited to, behind-the-ear (BTE), in-the-ear (ITE), in-the-canal (ITC), receiver-in-canal (RIC), or completely-in-the-canal (CIC) type hearing aids. It is understood that behind-the-ear type hearing aids may include devices that reside substantially behind the ear or over the ear. Such devices may include hearing aids with receivers associated with the electronics portion of the behind-the-ear device, or hearing aids of the type having receivers in the ear canal of the user, including but not limited to receiver-in-canal (RIC) or receiver-in-the-ear (RITE) designs. The present subject matter can also be used in hearing assistance devices generally, such as cochlear implant type hearing devices and such as deep insertion devices having a transducer, such as a receiver or microphone, whether custom fitted, standard, open fitted or occlusive fitted. It is understood that other hearing assistance devices not expressly stated herein may be used in conjunction with the present subject matter.

FIG. 1 is a block diagram illustrating an embodiment of a hearing assistance system 100. Hearing assistance system 100 transmits sounds into one or more ear canals of a user and includes a plurality of microphones 110, one or more receivers 130, and a processor 120 coupled between microphones 110 and receiver(s) 130. Microphones 110 receive sounds. Receiver(s) 130 deliver processed sounds to the one or more ear canals. Processor 120 processes the received sounds and includes an adaptive directionality controller 122. Adaptive directionality controller 122 controls a target direction of sound reception by system 100 and includes a beamformer 124, a speech detector 126, and a steering module 128. Beamformer 124 cancels received sounds that are not from the target direction by beamforming. Speech detector 126 detects off-axis speech being speech that is not from the target direction. Steering module 128 steers the beamformer in response to a detection of the off-axis speech to reduce cancellation of the off-axis speech by the beamformer.

In various embodiments, processor 120 includes a microprocessor-based circuit programmed to perform one or more of the various methods discussed in this document. In various other embodiments, processor 120 includes a custom integrated circuit configured to perform one or more of the various methods discussed in this document. In various other embodiments, processor 120 includes a combination of generic and custom circuits configured to perform one or more of the various methods discussed in this document.

Figure 2:
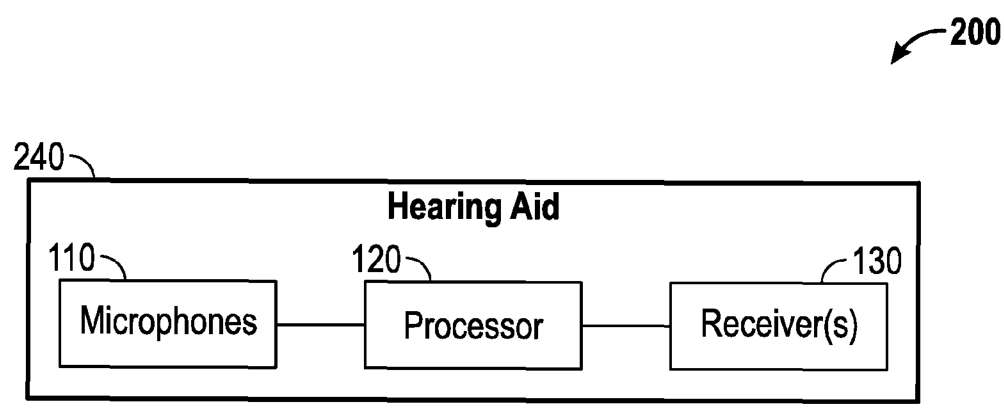
FIG. 2 is a block diagram illustrating an embodiment of the hearing assistance system including a mononaural hearing aid having the adaptive directionality control.

FIG. 2 is a block diagram illustrating an embodiment of a hearing assistance system 200. Hearing assistance system 200 represents an embodiment of hearing assistance system 100 and includes a mononaural hearing aid 240. Hearing aid 240 includes microphones 110, receiver(s) 130, and processor 120.

Figure 3:
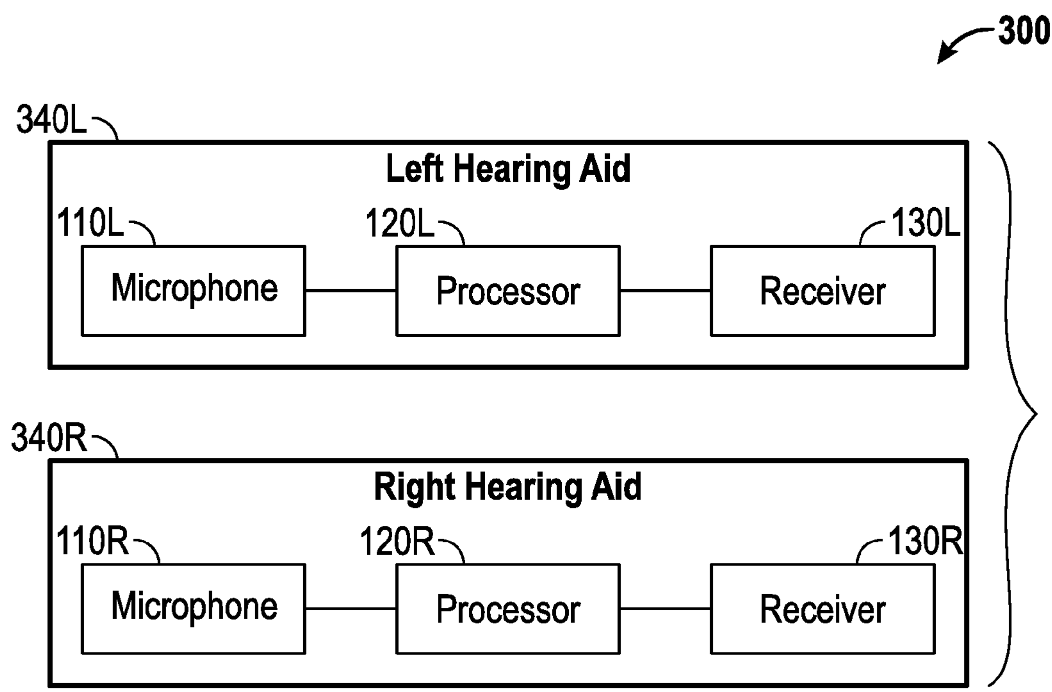
FIG. 3 is a block diagram illustrating an embodiment of the hearing assistance system including a pair of binaural hearing aids having the adaptive directionality control.

FIG. 3 is a block diagram illustrating an embodiment of hearing assistance system 200. Hearing assistance system 200 represents an embodiment of hearing assistance system 100 and includes a pair of binaural hearing aids, which includes a left hearing aid 340L and a right hearing aid 340R. Left hearing aid 340L includes at least one microphone 110L of microphones 110, at least one receiver 130L of receiver(s) 130, and a processor 120L including a portion of processor 120. Right hearing aid 340R includes at least one microphone 11 OR of microphones 110, at least one receiver 130R of receiver(s) 130, and a processor 120R including a portion of processor 120. In one embodiment, binaural hearing aids 340L and 340R are capable of ear-to-ear communication, which is controlled by processors 120L and 120R.

Figure 4:
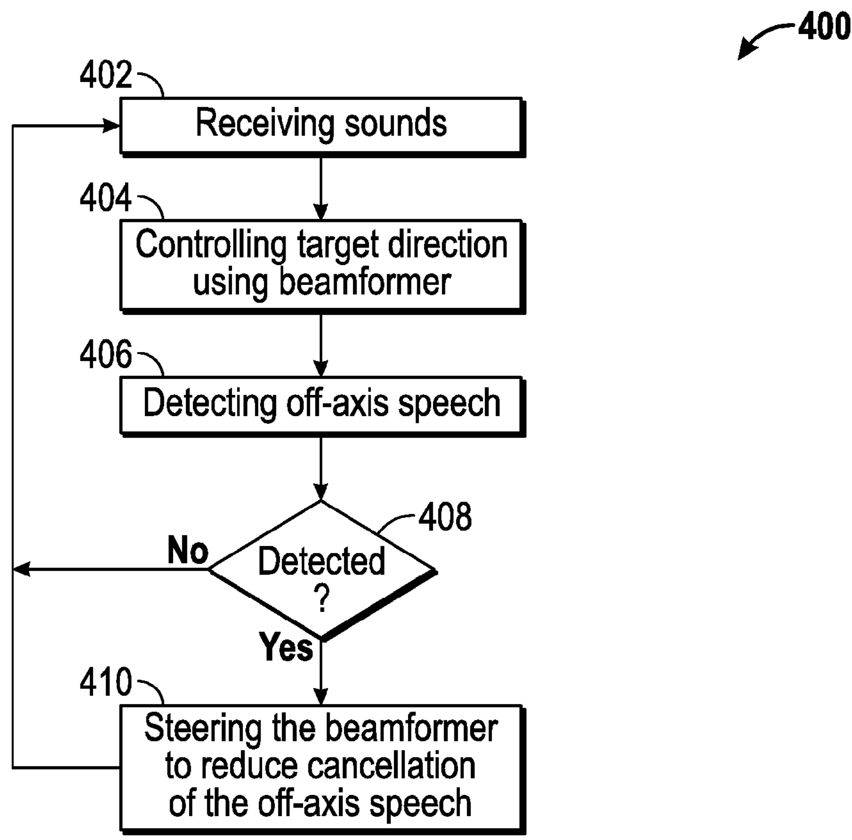
FIG. 4 is a flow chart illustrating an embodiment of a method for operating a hearing assistance system with adaptive directionality control.

FIG. 4 is a flow chart illustrating an embodiment of a method 400 for operating a hearing assistance system with adaptive directionality control, such as hearing assistance system 100 and its various embodiments. In one embodiment, adaptive directionality controller 122 is programmed to perform method 400.

At 402, sounds are received by the hearing assistance system. At 404, a target direction of the sound reception by the hearing assistance system is controlled using a beamformer. At 406, off-axis speech is detected. The off-axis speech is a speech that is not from the target direction. In response to a detection of the off-axis speech at 408, the beamformer is steered to reduce cancellation of the off-axis speech by the beamformer at 410. In various embodiments, the beamformer is steered away from the detected off-axis speech to minimize the cancellation of the off-axis speech by the beamformer at 410.

Flow charts are used in this document to illustrate various methods by way of example, and not by way of restriction. For each flow chart in this document, the blocks or steps are not necessarily performed in the order exactly as illustrated, as those skilled in the art will understand upon reading this document including the description associated with each of the flow charts.

Figure 5:
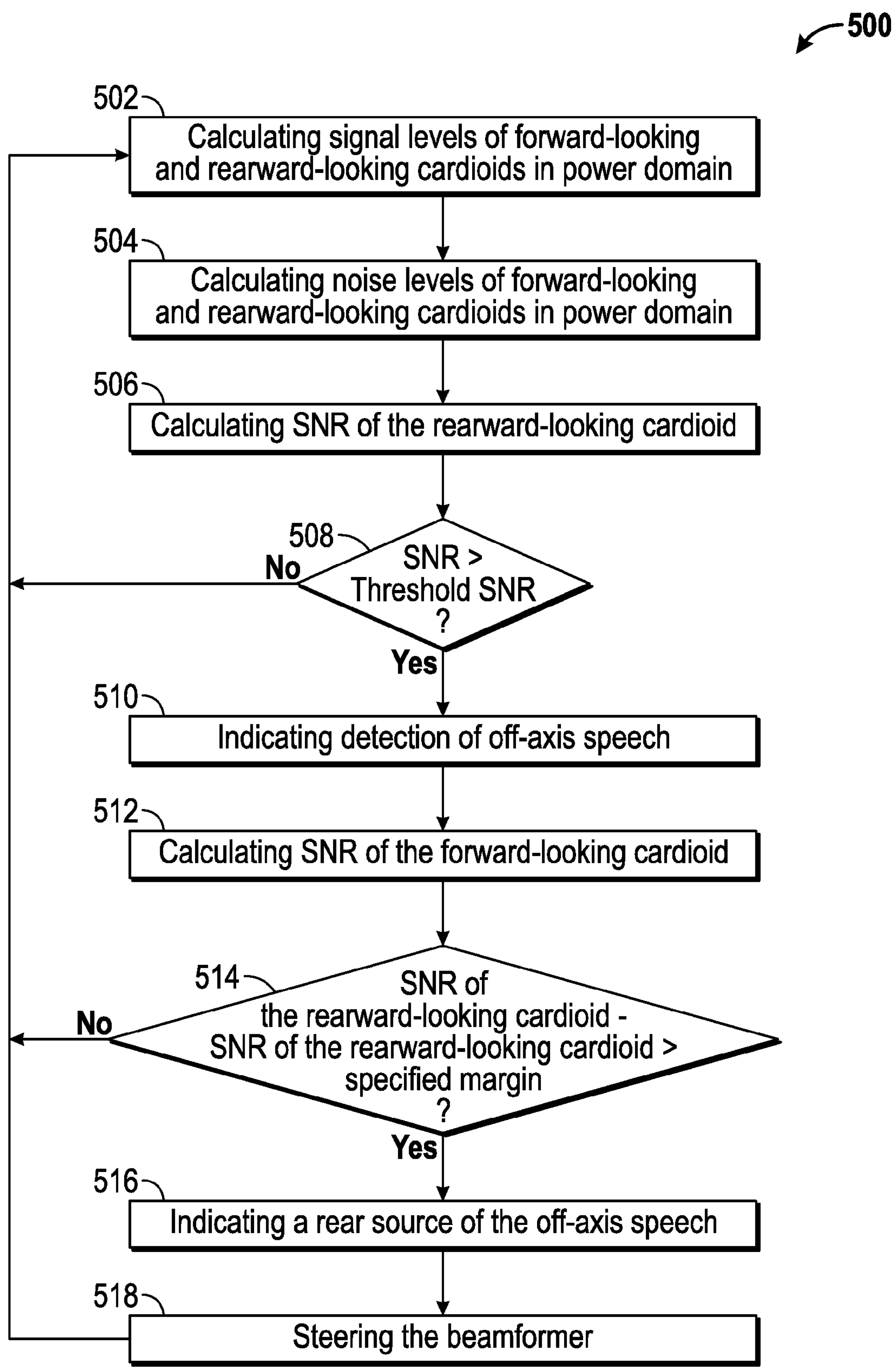
FIG. 5 is a flow chart illustrating another embodiment of a method for operating a hearing assistance system with adaptive directionality control.

FIG. 5 is a flow chart illustrating another embodiment of a method 500 for operating a hearing assistance system with adaptive directionality control. Method 500 represents an embodiment of method 400 and detects off-axis speech using output of forward-looking and rearward-looking cardioids. An example of the output of the forward-looking and rearward-looking cardioids is discussed in Elko, G. W. and Pong, A. N., "A simple first order directional microphone," *Proceedings of the IEEE Workshop Appl. Signal Process. Audio Acoust,* 1995: 169-172. The forward-looking cardioid is associated with the current beamformer. In one embodiment, adaptive directionality controller 122 is programmed to perform method 500.

At 502, a forward signal level and a rearward signal level are calculated in power domain. The forward signal level is a signal level of the forward-looking cardioid. The rearward signal level is a signal level of the rearward-looking cardioid.

At 504, a forward noise level and a rearward noise level are calculated in power domain. The forward noise level is a noise level of the forward-looking cardioid. The rearward signal level being a noise level of the rearward-looking cardioid. An example of a technique for calculating the forward and rearward noise levels is discussed in Martin, R., "Spectral Subtraction Based on Minimum Statistics", *EUSIPCO*-94, Edinburgh, Scotland, 13.-16. Sep. 1994, pp. 1182-1185.

At 506, a rearward signal-to-noise ratio (SNR), which is the SNR of the rearward-looking cardioid, is calculated using the rearward signal level and the rearward noise level. At 508, the rearward SNR is compared to a specified threshold SNR. At 510, a detection of off-axis speech is indicated in response to the rearward SNR being larger than the specified threshold SNR.

At 512, a forward SNR, which is the SNR of the forward-looking cardioid, is calculated using the forward signal level and the forward noise level. At 514, the rearward SNR is compared to the forward SNR. At 516, a rear source of the off-axis speech is indicated in response to the rearward SNR exceeding the forward SNR by a specified margin. In other words, if the rearward SNR is larger than the forward SNR by the specified margin, the off-axis speech is determined as being from the back of the user (listener).

At 516, the beamformer is steered in response to the rear source being indicated. In one embodiment, the beamformer is steered by changing a value of an adaptation speed of the beamformer. In one embodiment, the sign of this value is changed, so that the beamformer adapts away from the most dominant source of speech instead of towards the most dominant source of speech.

Figure 6:
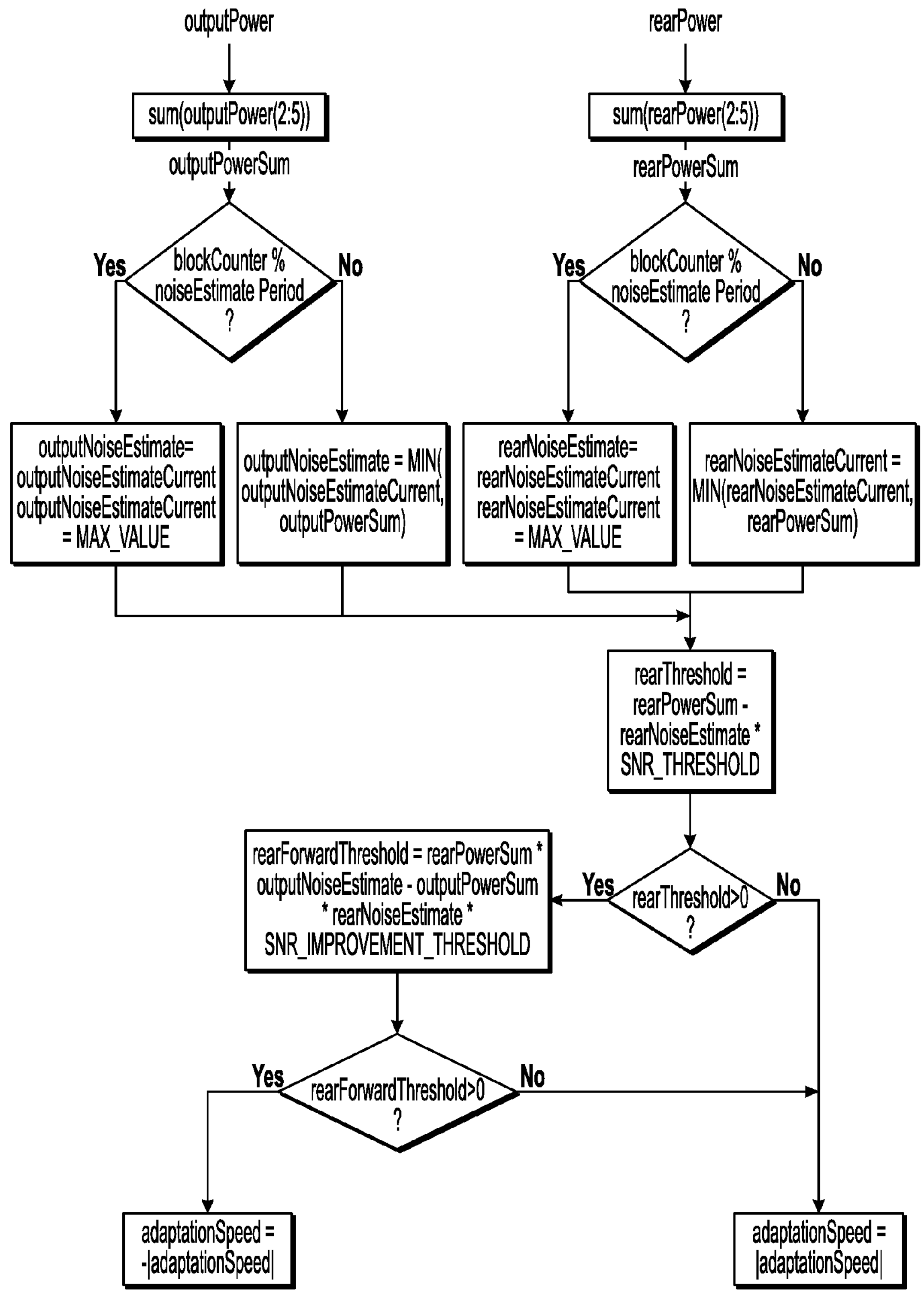
FIG. 6 is a flow chart illustrating an embodiment of an algorithm implementing the method of FIG. 5.

FIG. 6 is a flow chart illustrating an embodiment of an algorithm implementing method 500. MAX_VALUE is the maximum value that outputPowerSum and rearPowerSum can have. The parameters outputNoiseEstimate, outputNoiseEstimateCurrent, rearNoiseEstimate, and rearNoiseEstimateCurrent are initialized to MAX_VALUE.

FIGS. 7-10 are graphs showing measured behavior of an off-axis speech detector in different scenarios. This off-axis speech detector is an implementation of speech detector 126.

Figure 7A:
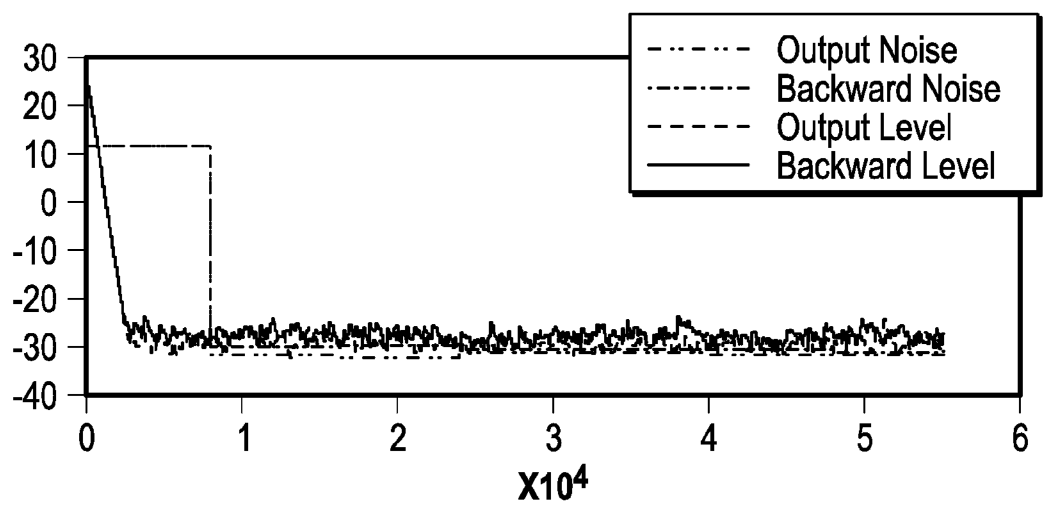
FIGS. 7A-C show behavior of the off-axis speech detector for diffuse noise only condition.
Figure 7B:
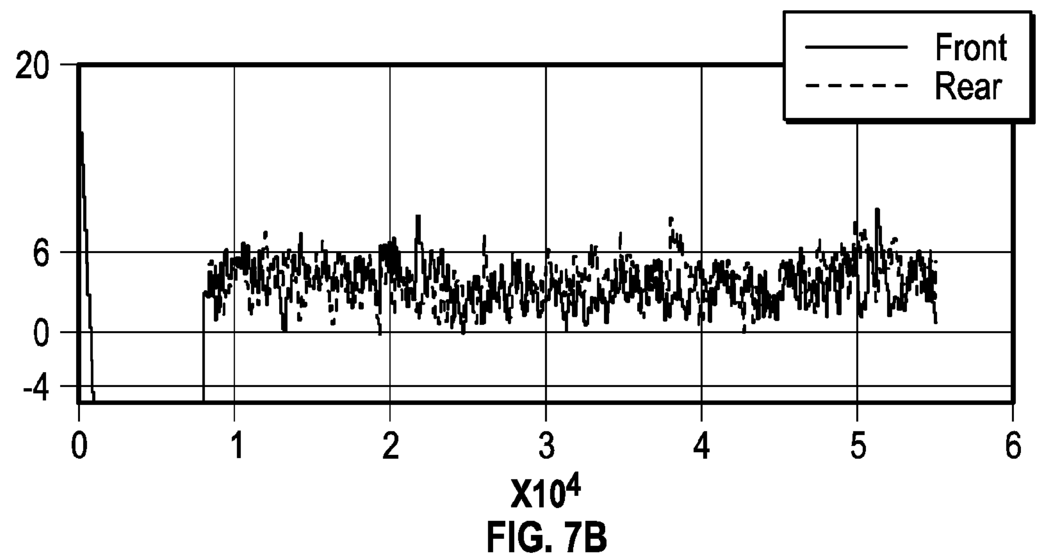
Figure 7C:
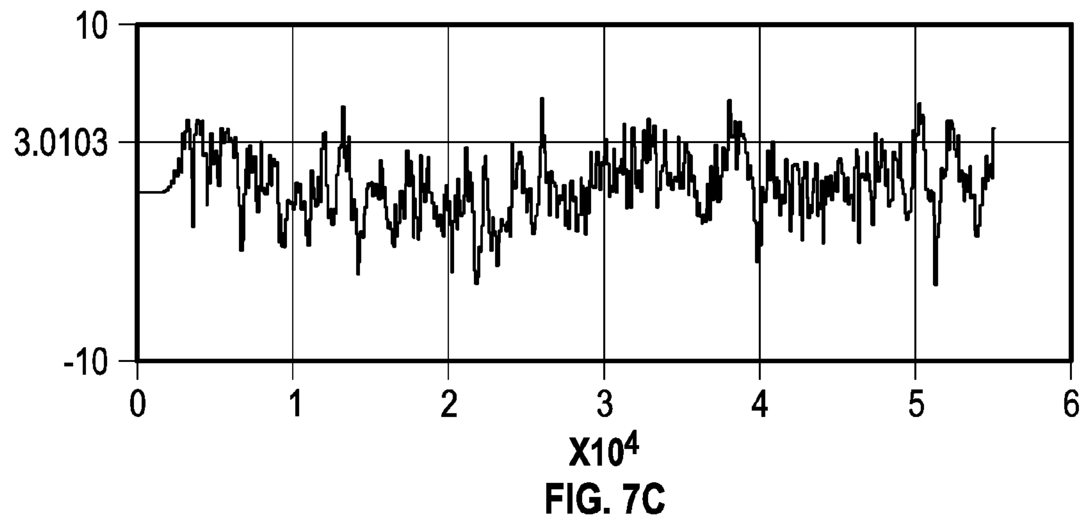

FIG. 7A shows the forward signal level (OutputLevel), the rearward signal level (BackwardLevel), the forward noise level (Output Noise), and the rearward noise level (BackwardNoise) for diffuse noise only condition. FIG. 7B shows the forward SNR (front) and rearward SNR (rear). The SNRs are below 6 dB for most instances (as expected). FIG. 7C shows SNR improvement of using rearward-looking cardioid over forward-looking cardioids (current beamformer). The improvement is below 3 dB (as expected).

Figure 8A:
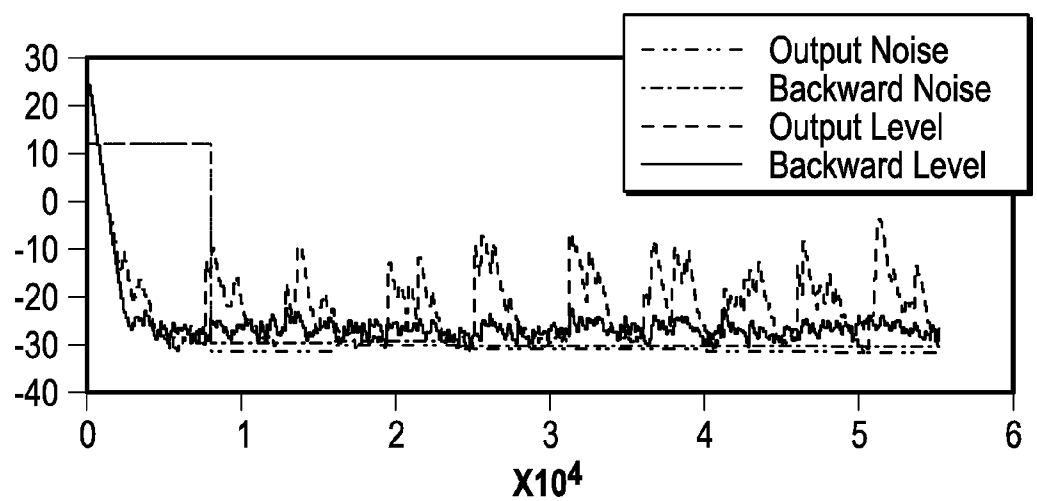
FIGS. 8A-C show behavior of the off-axis speech detector for speech at 0 degree from a target direction and diffuse noise with a signal-to-noise ratio (SNR) at 10 dB.
Figure 8B:
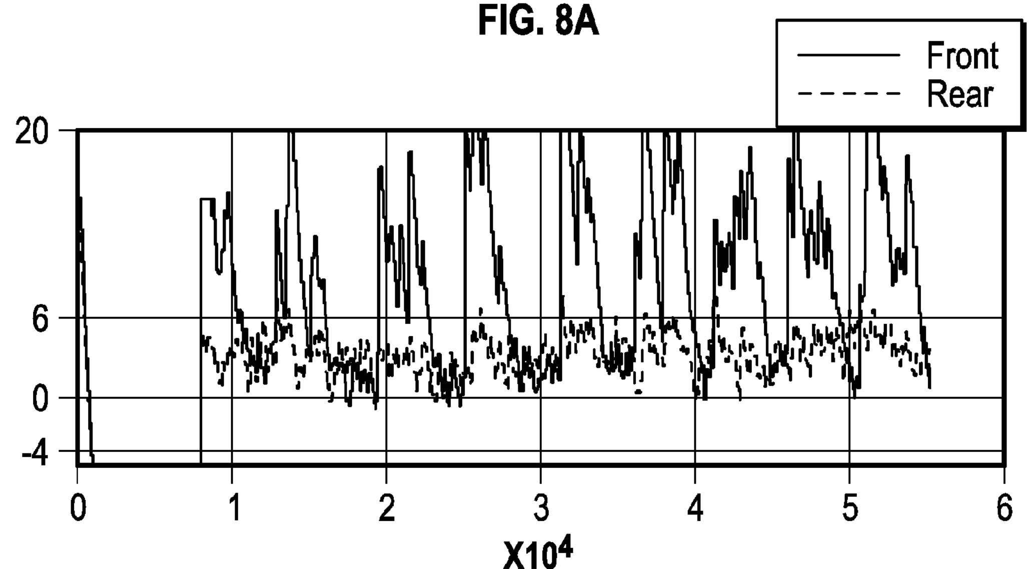
Figure 8C:
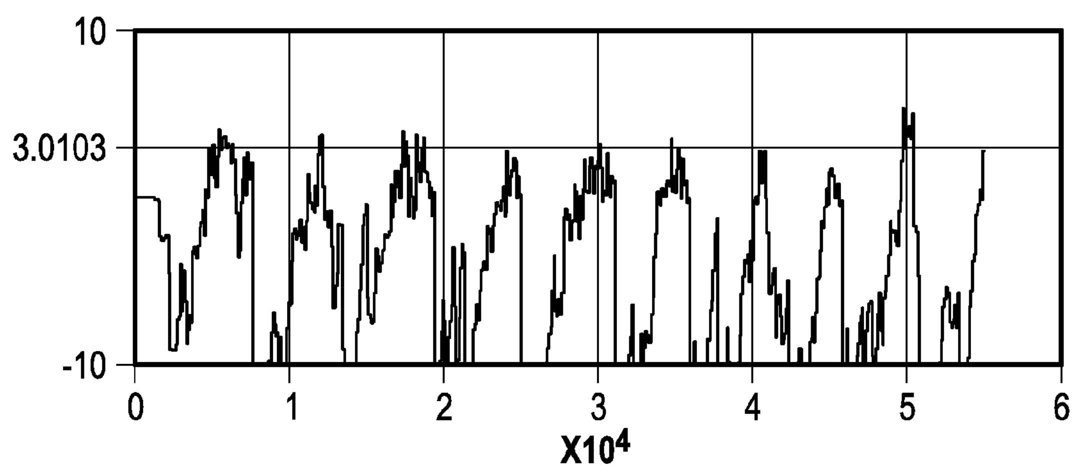

FIG. 8A shows the forward signal level (OutputLevel), the rearward signal level (BackwardLevel), the forward noise level (Output Noise), and the rearward noise level (BackwardNoise) for speech at 0 degree from the target direction and diffuse noise with SNR at 10 dB. FIG. 8B shows the forward SNR (front) and rearward SNR (rear). The forward SNR is above the rearward SNR for most instances. FIG. 8C shows SNR improvement of using rearward-looking cardioid over forward-looking cardioids (current beamformer). The improvement is below 3 dB. The maximum improvement is observed when there is no speech.

Figure 9A:
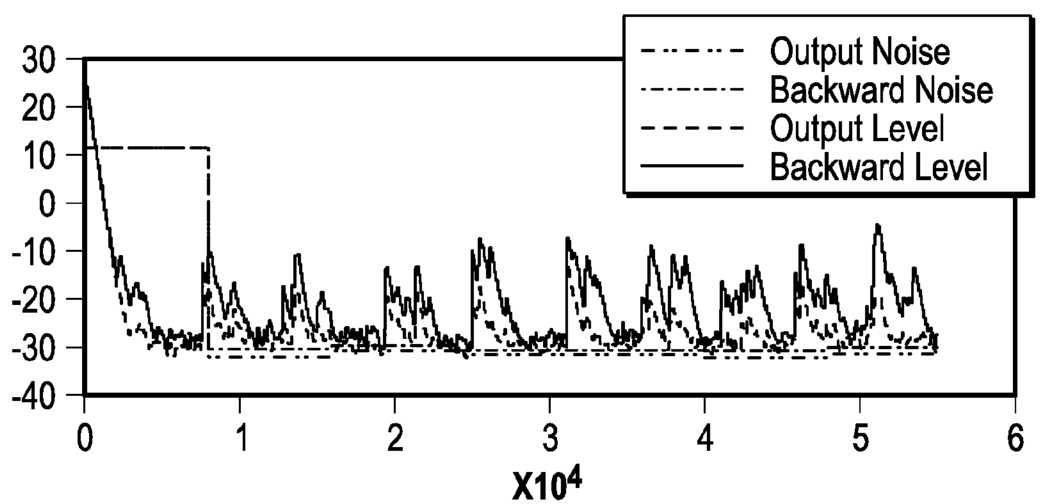
FIGS. 9A-C show behavior of the off-axis speech detector for speech at 180 degree from the target direction and diffuse noise with an SNR at 10 dB.
Figure 9B:
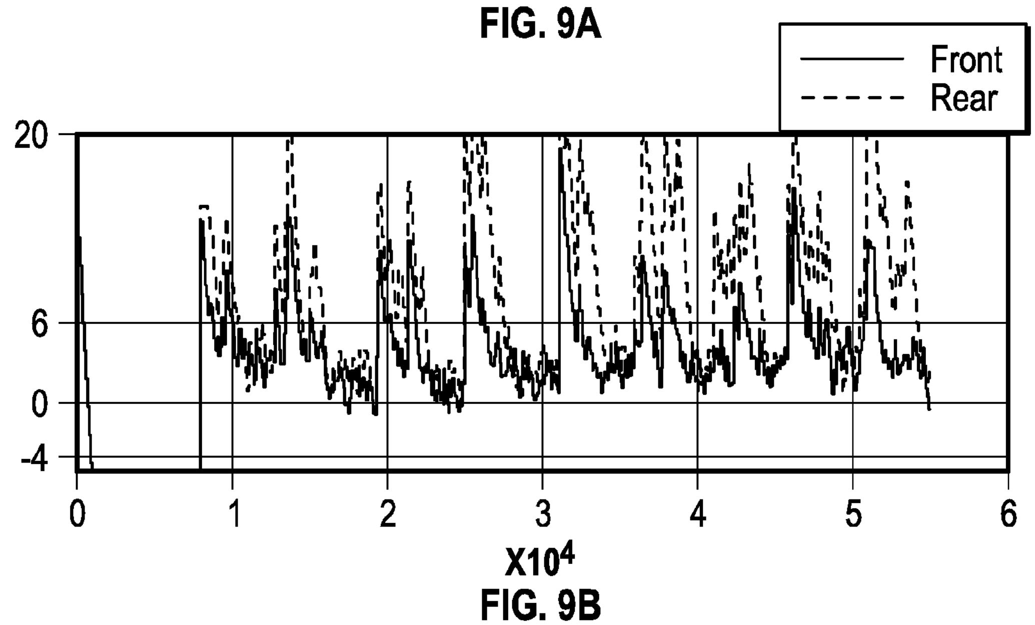
Figure 9C:
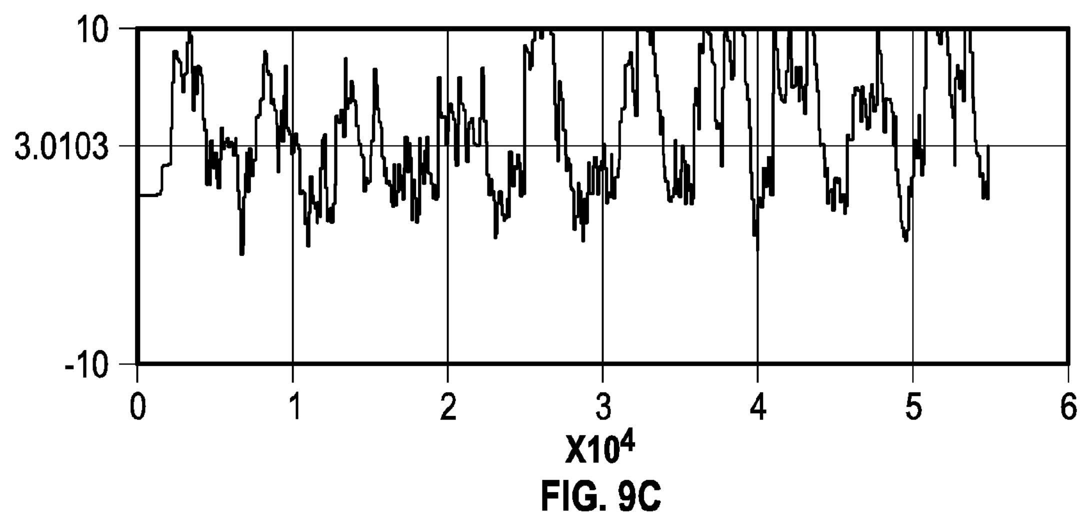

FIG. 9A shows the forward signal level (OutputLevel), the rearward signal level (BackwardLevel), the forward noise level (Output Noise), and the rearward noise level (BackwardNoise) for speech at 180 degrees from the target direction and diffuse noise with SNR at 10 dB, with the off-axis detector turned off. FIG. 9B shows the forward SNR (front) and rearward SNR (rear). The rearward SNR is above the forward SNR for most instances. The forward SNR gets worse as speech increases. FIG. 9C shows SNR improvement of using rearward-looking cardioid over forward-looking cardioids (current beamformer). The improvement is above 3 dB when speech is present.

Figure 10A:
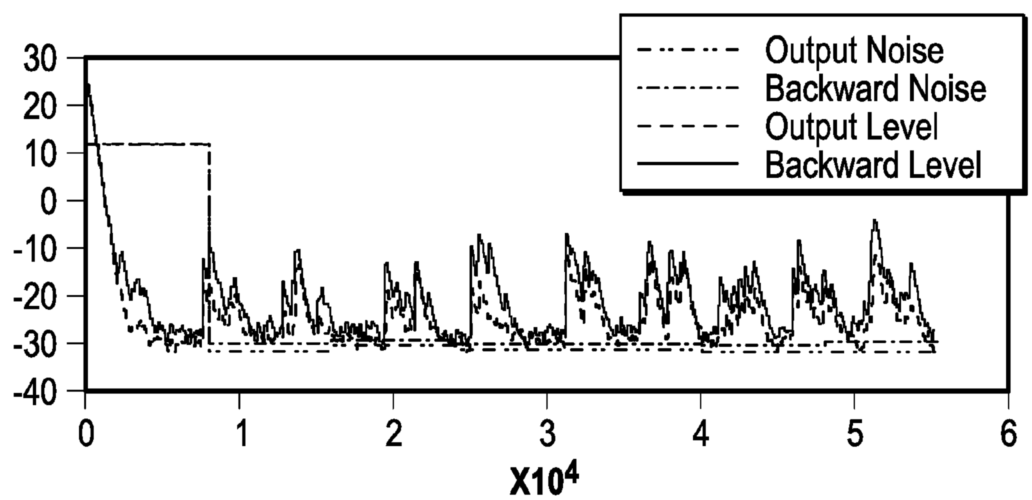
Figure 10B:
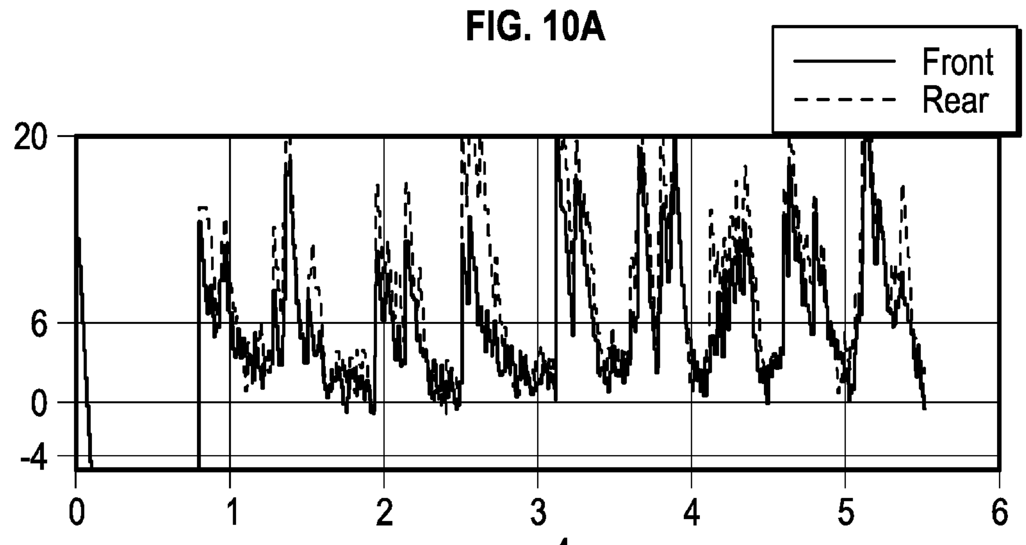
Figure 10C:
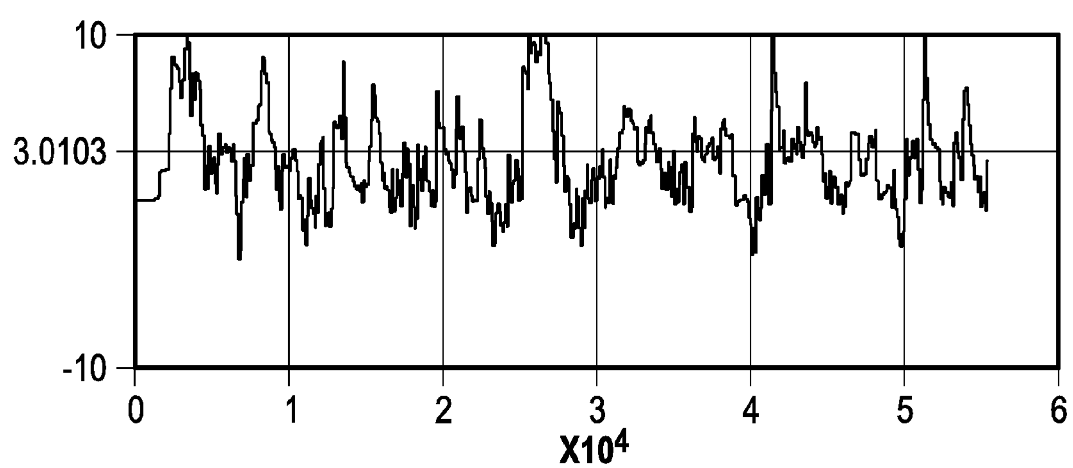

FIG. 10A shows the forward signal level (OutputLevel), the rearward signal level (BackwardLevel), the forward noise level (Output Noise), and the rearward noise level (BackwardNoise) for speech at 180 degrees from the target direction and diffuse noise with SNR at 10 dB, with the off-axis detector turned on. FIG. 10B shows the forward SNR (front) and rearward SNR (rear). The rearward SNR is higher than the forward SNR for most instances. The forward SNR gets worse as speech increases. FIG. 10C shows SNR improvement of using rearward-looking cardioid over forward-looking cardioids (current beamformer). The improvement is above 3 dB when speech is present. When the off-axis speech detector is turned on, the forward SNR (FIG. 10B, "front") is substantially higher than the forward SNR (FIG. 9B, "front") when the off-axis speech detector is turned off. The improved forward SNR is proof that the off-axis speech detector protects the speech.

The values of beta (beamformer coefficient) as function of time and frequency for speech at 180 degrees from the target direction and diffuse noise with SNR at 10 dB, with the off-axis speech detector turned on and off, are measured. When the off-axis speech detector is turned off, beta goes towards 0 (180 degrees). When the off-axis speech detector is turned on, beta goes towards 1 (90 degrees).

Figure 11:
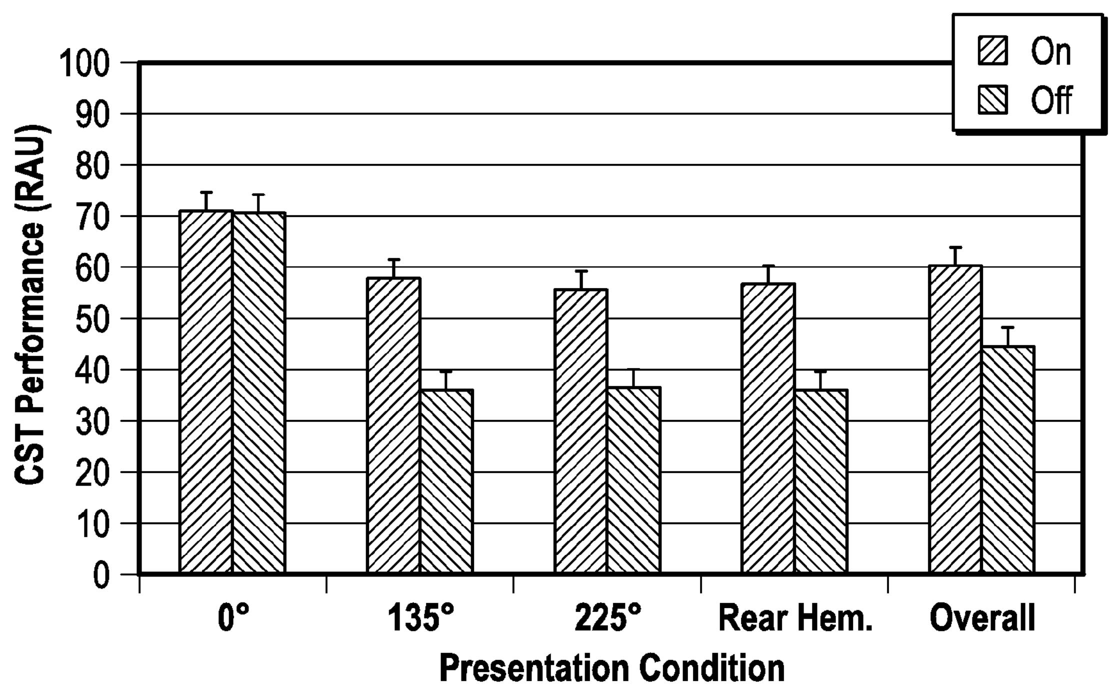
FIG. 11 is a graph showing results of using an off-axis speech detector in improving understanding of speech from a rear source (behind the listener).

The off-axis speech detector, as the implementation of speech detector 126, has been tested in a clinical evaluation. A Connected Speech Test (CST) was done with noise from all angles and speech from 0 degree, 135 degrees, and 225 degrees. FIG. 11 is a graph showing results of using the off-axis speech detector in improving understanding of speech from a rear source, i.e., behind the user (listener), as desired. In FIG. 11, CST performance is plotted as function of angle of inciding speech for the off-axis speech detector turn off (Off) and on (On).

When adaptive directionality is enabled in a pair of binaural hearing aids, such as left hearing aid 340L and right hearing aid 340R, a further enhancement can be made by linking the functionality through ear-to-ear communication. An example of research on preference evaluation reached the following conclusions: (1) preference is based primarily on the location of the speech signal, with background noise location as a secondary consideration, and (2) maintaining some signal audibility, even when listening comfort is the primary goal, is a consistent and recurring theme. This research emphasizes the use of the off-axis speech detector, because it preserves the speech. In a binaural system, however, the information of two sides can be used to improve it.

Figure 12:
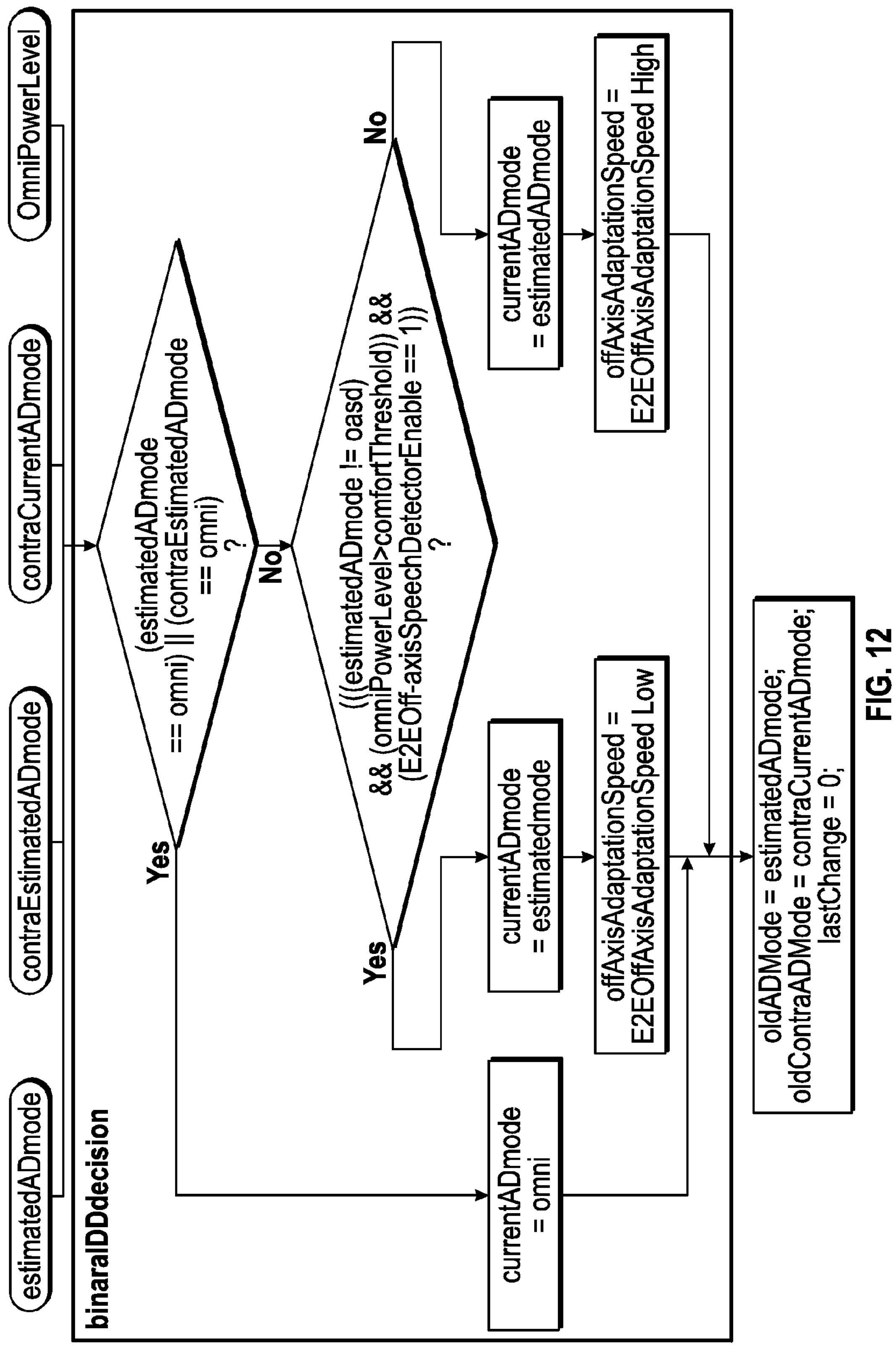
FIG. 12 is a flow chart illustrating an embodiment of a method for detecting off-axis speech detection during ear-to-ear communication.

FIG. 12 is a flow chart illustrating an embodiment of a method for detecting off-axis speech detection during ear-to-ear communication. In a non-ear-to-ear mode, the off-axis speech detector of each of the hearing aids works independently to preserve speech as good as possible. When the ear-to-ear communication is enabled, it is possible to detect which side is closer to the speech and have that side focus on the speech and the other side focus on providing comfort, if the input level is higher than a certain threshold. This idea is illustrated in the flow chart of FIG. 12, which represents part of an example of an ear-to-ear communication algorithm. Each hearing aid estimates a (long-term) local mode of the directionality: omnidirectional, adaptive, or off-axis speech. The hearing aids exchange the two local modes. If one of the hearing aids has an omnidirectional mode, both hearing aids will go to omnidirectional. If both hearing aids are in the adaptive or off-axis speech modes, both hearing aids will go to the adaptive or off-axis speech modes. If one hearing aid is in the off-axis speech mode and the other hearing aid is in the adaptive mode, the hearing aid in the off-axis speech mode is closer to the speech. The other hearing aid will disable its short-term off-axis speech detection if the input level is above a certain threshold, because the user would prefer listening comfort over intelligibility at high input levels.

Figure 13:
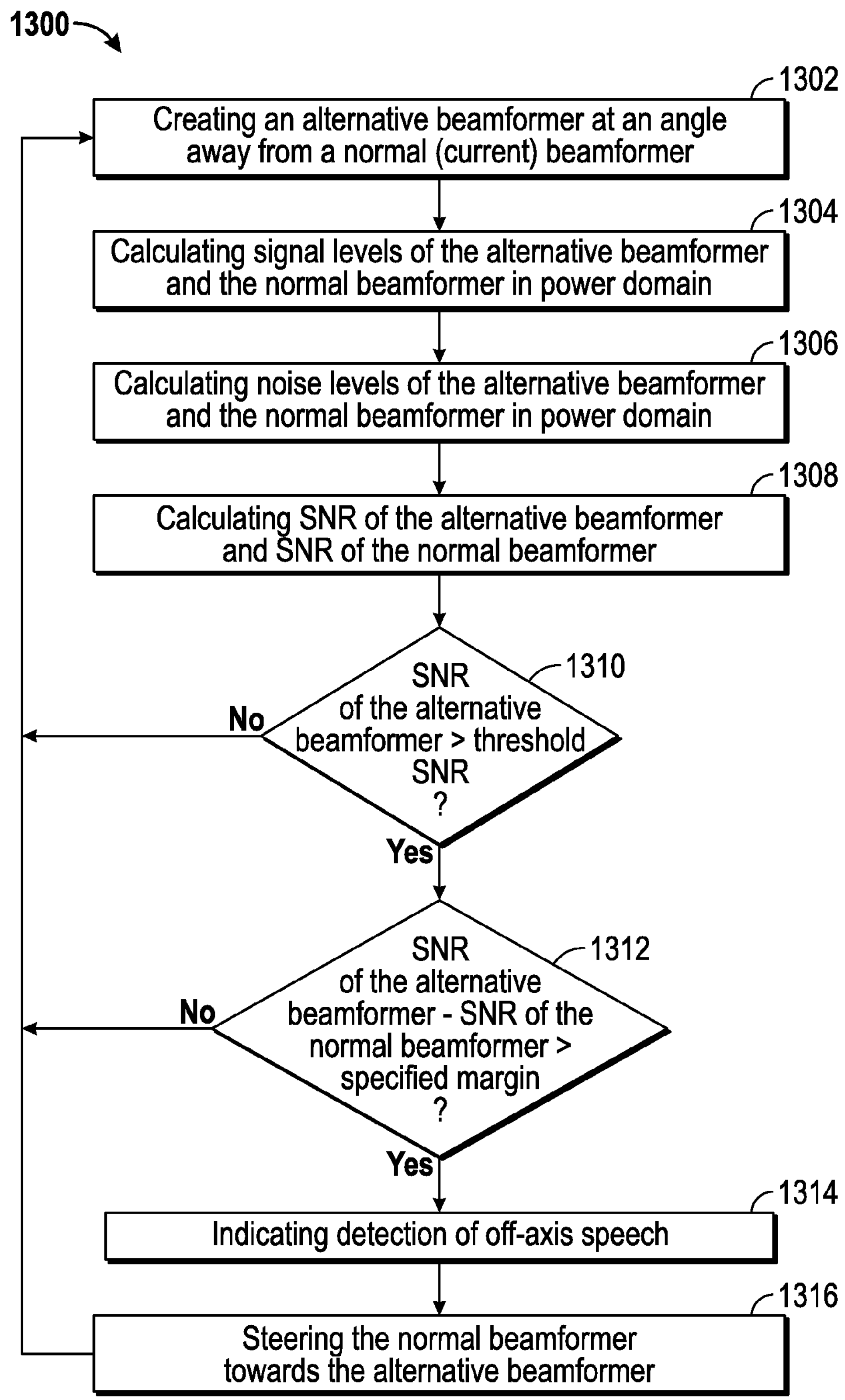
FIG. 13 is a flow chart illustrating another embodiment of a method for operating a hearing assistance system with adaptive directionality control.

FIG. 13 is a flow chart illustrating an embodiment of a method 1300 for operating a hearing assistance system with adaptive directionality control. Method 1300 represents another embodiment of method 400 and detects off-axis speech using output of the forward-looking and rearward-looking cardioids. The forward-looking cardioid is associated with the current beamformer. In one embodiment, adaptive directionality controller 122 is programmed to perform method 1300.

At 1302, an alternative beamformer is created at an angle away from a normal (current) beamformer. In one embodiment, this alternative beamformer is created by producing a signal by multiplying a rearward-looking cardioid signal with a coefficient betaDiff, which corresponds to a specified angle away from an actual (normal) beamformer coefficient beta, and subtracting the produced signal from a forward-looking cardioid signal to result in an alternative beamformer signal.

At 1304, an alternative signal level and a normal signal level are calculated in power domain. The alternative signal level is a signal level of the alternative beamformer. The normal signal level is a signal level of a normal beamformer.

At 1306, an alternative noise level and a normal noise level are calculated in power domain. The alternative noise level is a noise level of the alternative beamformer. The normal noise level is a noise level of the normal beamformer. An example of a technique for calculating these noise levels is discussed in Martin, R., "Spectral Subtraction Based on Minimum Statistics", *EUSIPCO*-94, Edinburgh, Scotland, 13.-16. Sep. 1994, pp. 1182-1185.

At 1308, an alternative SNR is calculated using the alternative signal level and the alternative noise level, and a normal SNR is calculated using the normal signal level and the normal noise level. The alternative SNR is the SNR of the alternative beamformer. The normal SNR is the SNR of the normal beamformer.

At 1310, the alternative SNR is compared to a specified threshold SNR. At 1312, the alternative SNR is compared to the normal SNR in response to the alternative SNR exceeding the specified threshold SNR. At 1314, a detection of off-axis speech is indicated in response to the alternative SNR exceeding the normal SNR by a specified margin.

At 1316, the normal beamformer is steered towards the alternative beamformer in response to the detection of the off-axis speech being indicated. In one embodiment, this includes adapting the coefficient of the normal beamformer towards the coefficient of the alternative beamformer.

Figure 14:
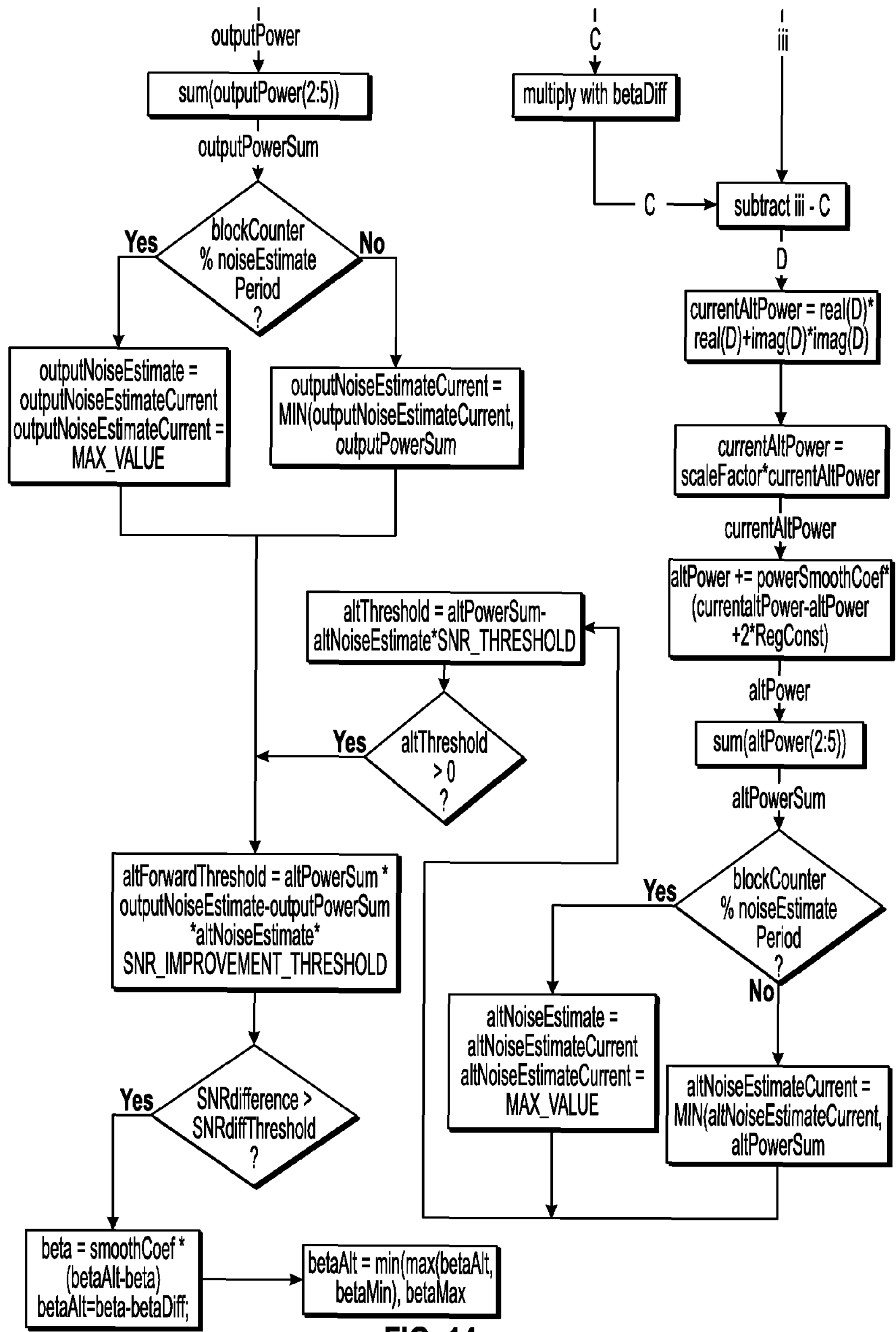
FIG. 14 is a flow chart illustrating an embodiment of an algorithm implementing the method of FIG. 13.

FIG. 14 is a flow chart illustrating an embodiment of an algorithm implementing method 1300. The rearward-looking cardioid (C) is multiplied with an alternative coefficient betaDiff and subtracted from the forward-looking cardioid. The SNR of the resulting alternative beamformer is compared to the SNR of the normal beamformer. If the SNR of the alternative beamformer is larger than a threshold, and the SNR of the alternative beamformer is higher than the SNR of the normal beamformer, the off-axis detector detects off-axis speech, and the beamformer coefficient is adapted to the alternative beamformer coefficient betaDiff.

Figure 15:
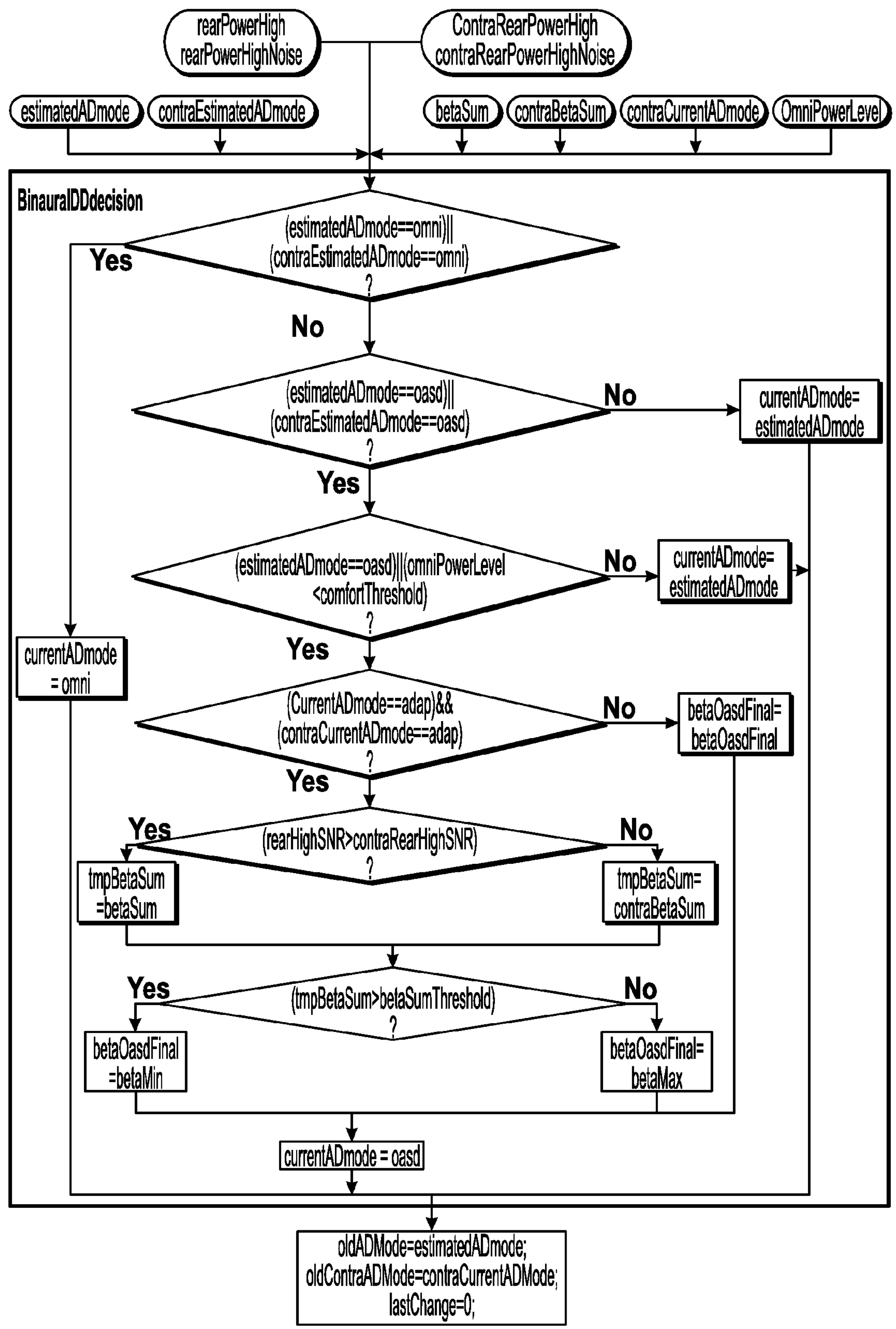
FIG. 15 is a flow chart illustrating another embodiment of a method for detecting off-axis speech detection during ear-to-ear communication.

FIG. 15 is a flow chart illustrating another embodiment of a method for detecting off-axis speech detection during ear-to-ear communication. In this embodiment, the off-axis speech detector reverts to the adaptation direction in response to a detection of off-axis speech. Hence a new position of the null of the beamformer will depend on the current position of the null and the position of the detected off-axis speech. The null may go to different angles for different frequencies.

In the illustrated embodiment, when the ear-to-ear communication is used, the information of both hearing aids is used to estimate the position of the off-axis speech, and the null is moved away from that position. The hearing aids estimate the SNR of the rearward-looking cardioid at high frequencies. The hearing aid with the highest SNR is closer to the source of the off-axis speech. The position of the source of the off-axis speech is estimated by averaging the value of beta which indicates the position of the null. This averaged beta value is compared to a threshold. If the value is above the threshold, the null is steered towards 180 degrees from the target direction. If the value is below the threshold, the null is steered towards 90 degrees from the target direction.

Another embodiment (not shown in FIG. 15) uses a beamformer whose example is discussed in Warsitz, E. and Reinhold Haeb-Umbach, "Acoustic filter-and-sum beamforming by adaptive principal component analysis," *Acoustics, Speech, and Signal Processing,* 2005. *Proceedings. ICASSP '05*, vol. 4, no., pp. iv/797-iv/800 Vol. 4, 18-23 Mar. 2005. This embodiment requires transfer of audio (or encoded audio) and synchronized hearing aids.

The present method and system provide the ability to maintain intelligibility of off-axis speech sources without any audible distortions. Various embodiments of the present method and system may be included in adaptive directionality feature of hearing aids.

This application is intended to cover adaptations or variations of the present subject matter. It is to be understood that the above description is intended to be illustrative, and not restrictive. The scope of the present subject matter should be determined with reference to the appended claims, along with the full scope of legal equivalents to which such claims are entitled.

What is claimed is:

1. A method for controlling directionality of sound reception in a hearing assistance system, comprising:
- receiving sound signals including speech and noise using two or more microphones of the hearing assistance system;
- determining a target direction using output of the two or more microphones;
- controlling directionality of sound reception by cancelling the received sound signals that are not from the target direction;
- producing an alternative signal by multiplying a rearward-looking cardioid signal with a coefficient and subtracting a signal resulting from the multiplication from a forward-looking cardioid signal;
- detecting off-axis speech from the received sound signals using the alternative signal, the off-axis speech being speech that is not from the target direction; and
- adjusting the directionality of sound reception by reducing the cancellation of the off-axis speech, while limiting a change to the cancellation of the noise, in response to a detection of the off-axis speech.

2. The method of claim 1, wherein receiving the sound signals comprises receiving the sound signals using two or more microphones of one or more hearing aids.

3. The method of claim 2, wherein receiving the sound signals comprises receiving the sound signals using two or more microphones of a hearing aid device of a mononaural hearing aid system.

4. The method of claim 2, wherein receiving the sound signals comprises receiving the sound signals using two or more microphones of two hearing aid devices of a binaural hearing aid system.

5. The method of claim 1, wherein detecting the off-axis speech comprises detecting the off-axis speech using output of forward-looking and rearward-looking cardioids.

6. The method of claim 1, wherein detecting the off-axis speech comprises:
- calculating a rearward signal-to-noise ratio (SNR), the rearward SNR being the SNR of a rearward-looking cardioid;
- comparing the rearward SNR to a specified threshold SNR; and
- indicating the detection of the off-axis speech in response to the rearward SNR being larger than the specified threshold SNR.

7. The method of claim 6, wherein detecting the off-axis speech further comprises:
- calculating a forward SNR, the forward SNR being the SNR of a forward-looking cardioid;
- comparing the rearward SNR to the forward SNR; and
- indicating a rear source of the off-axis speech in response to the rearward SNR exceeding the forward SNR by a specified margin.

8. A method for controlling directionality of sound reception in a hearing assistance system, comprising:
- receiving sound signals using two or more microphones of the hearing assistance system;
- determining a target direction of sound reception using output of the two or more microphones;
- cancelling the received sound signals that are not from the target direction;
- detecting off-axis speech being speech from a speech direction different from the target direction, including:
  - producing an alternative signal by multiplying a rearward-looking cardioid signal with a coefficient and subtracting a signal resulting from the multiplication from a forward-looking cardioid signal; and
  - detecting the off-axis speech using the alternative signal; and
- reducing the cancellation of the received sound signals that are from the speech direction, without substantially changing the cancellation of the received sound signals that are not received from the speech direction, in response to a detection of the off-axis speech.

9. The method of claim 8, wherein detecting the off-axis speech comprises:
- calculating an alternative signal-to-noise ratio (SNR) associated with the alternative signal;
- calculating a normal SNR associated with the rearward-looking cardioid signal and the forward-looking cardioid signal; and
- detecting the off-axis speech using the alternative SNR and the normal SNR.

10. The method of claim 9, wherein detecting the off-axis speech comprises:
- comparing the alternative SNR to a specified threshold SNR;
- comparing the alternative SNR to the normal SNR in response to the alternative SNR exceeding the specified threshold SNR; and
- indicating the detection of the off-axis speech in response to the alternative SNR exceeding the normal SNR by a specified margin.

11. A hearing assistance system; comprising:
- a plurality of microphones configured to receive sounds including speech and noise; and
- a processor configured to:
  - determine a target direction using the received sounds;
  - control a directionality of sound reception by cancelling the received sounds that are not from the target direction;
  - produce an alternative signal by multiplying a rearward-looking cardioid signal with a coefficient and subtracting a signal resulting from the multiplication from a forward-looking cardioid signal;
  - detect off-axis speech from the received sounds using the alternative signal, the off-axis speech being speech that is not from the target direction; and
  - adjust the directionality of sound reception by reducing the cancellation of the off-axis speech, while substantially maintaining the noise level, in response to a detection of the off-axis speech.

12. The system of claim 11, comprising a mononaural hearing aid system including a hearing aid devices, the hearing aid devices including the plurality of microphones and the processor.

13. The system of claim 11, comprising a binaural hearing aid system including two hearing aid devices, the two hearing aid devices including the plurality of microphones and the processor.

14. The system of claim 11, wherein the processor is configured to detect the off-axis speech using output of forward-looking and rearward-looking cardioids.

15. The system of claim 11, wherein the processor is configured to:

calculate a rearward signal-to-noise ratio (SNR), the rearward SNR being the SNR of a rearward-looking cardioid; and detect the off-axis speech using the rearward SNR.

16. The system of claim 15, wherein the processor is configured to detect the off-axis speech using the rearward SNR and a specified threshold SNR.

17. The system of claim 16, wherein the processor is configured to:

calculate a forward SNR, the forward SNR being the SNR of a forward-looking cardioid; and detect the off-axis speech using the rearward SNR and the forward SNR.

18. A hearing assistance system, comprising:

a plurality of microphones configured to receive sounds; and a processor configured to:

control a target direction of sound reception by cancelling the received sounds that are not from the target direction;

produce an alternative signal by multiplying a rearward-looking cardioid signal with a coefficient and subtracting a signal resulting from the multiplication from a forward-looking cardioid signal;

detect the off-axis speech using the alternative signal, the off-axis speech being speech from a speech direction different from the target direction; and reduce the cancellation of the received sound signals that are from the speech direction, without substantially changing the cancellation of the received sound signals that are not received from the speech direction, in response to a detection of the off-axis speech.

19. The system of claim 18, wherein the processor is configured to:

calculate an alternative signal-to-noise ratio (SNR) associated with the alternative signal; and detect the off-axis speech using the alternative SNR and a specified threshold SNR.

20. The system of claim 19, wherein the processor is configured to:

calculate a normal SNR associated with the rearward-looking cardioid signal and the forward-looking cardioid signal; and detect the off-axis speech using the alternative SNR and the normal SNR.

* * * * *